(12) United States Patent
Shen et al.

(10) Patent No.: US 7,818,542 B2
(45) Date of Patent: Oct. 19, 2010

(54) METHOD AND APPARATUS FOR LENGTH DECODING VARIABLE LENGTH INSTRUCTIONS

(75) Inventors: Gene W. Shen, San Jose, CA (US); Sean Lie, Santa Clara, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 370 days.

(21) Appl. No.: 11/775,451

(22) Filed: Jul. 10, 2007

(65) Prior Publication Data

US 2009/0019263 A1 Jan. 15, 2009

(51) Int. Cl.
G06F 9/30 (2006.01)
G06F 9/32 (2006.01)

(52) U.S. Cl. .................. 712/210; 712/208; 712/212

(58) Field of Classification Search .............. 712/208, 712/210, 212
See application file for complete search history.

(56) References Cited

U.S. PATENT DOCUMENTS

| | | | | |
|---|---|---|---|---|
| 5,537,629 | A | * | 7/1996 | Brown et al. ............. 712/210 |
| 5,819,056 | A | * | 10/1998 | Favor ..................... 712/204 |
| 5,819,057 | A | * | 10/1998 | Witt et al. ............... 712/204 |
| 5,822,558 | A | | 10/1998 | Tran |
| 5,832,249 | A | * | 11/1998 | Tran et al. ............... 712/204 |
| 5,845,099 | A | | 12/1998 | Krishnamurthy et al. |
| 5,948,096 | A | | 9/1999 | Ginosar et al. |
| 6,006,324 | A | * | 12/1999 | Tran et al. ............... 712/204 |
| 6,141,742 | A | * | 10/2000 | Favor ..................... 711/220 |
| 6,393,549 | B1 | * | 5/2002 | Tran et al. ............... 712/204 |
| 6,405,303 | B1 | * | 6/2002 | Miller et al. ............. 712/210 |
| 2007/0008197 | A1 | | 1/2007 | Ohashi et al. |
| 2007/0109160 | A1 | | 5/2007 | Pisarevsky et al. |
| 2007/0183506 | A1 | | 8/2007 | Chujoh et al. |

FOREIGN PATENT DOCUMENTS

WO 00/26769 5/2000

OTHER PUBLICATIONS

International Search Report and Written Opinion of the International Searching Authority mailed Oct. 8, 2008 for International Application No. PCT/US2008/008469 filed Jul. 10, 2008.

* cited by examiner

Primary Examiner—Aimee J Li
(74) Attorney, Agent, or Firm—Meyertons, Hood, Kivlin, Kowert & Goetzel, P.C.

(57) ABSTRACT

A mechanism for superscalar decode of variable length instructions. The decode mechanism may be included within a processing unit, and may comprise a length decode unit. The length decode unit may obtain a plurality of instruction bytes. The instruction bytes may be associated with a plurality of variable length instructions, which are to be executed by the processing unit. The length decode unit may perform a length decode operation for each of the plurality of instruction bytes. For each instruction byte, the length decode unit may estimate the instruction length of a current variable length instruction associated with a current instruction byte. Furthermore, during the length decode operation, for each instruction byte, the length decode unit may estimate the start of a next variable length instruction based on the estimated instruction length of the current variable length instruction, and store a first pointer to the estimated start of the next variable length instruction.

20 Claims, 10 Drawing Sheets

METHOD AND APPARATUS FOR LENGTH DECODING VARIABLE LENGTH INSTRUCTIONS

BACKGROUND OF THE INVENTION

1. Field of the Invention

This invention relates to microprocessor architecture and, more particularly, to a superscalar variable length instruction decode mechanism.

2. Description of the Related Art

In various systems, the front end of a processor core may include a mechanism for length decoding and identifying boundaries of variable length instructions. In some designs, the length decode mechanisms identifies the end of each of the variable length instructions and then stores endbits at the end of each instruction to identify the instruction boundaries. The variable length instructions and corresponding endbits are usually stored in the instruction cache (L1 cache) of the processor core to await further processing. The endbits may also be stored in the L2 cache of the processor. Storing endbits, along with the instructions, in the instruction cache and L2 cache may take up a significant amount of room. The relatively large size of the instruction cache and L2 cache that may be needed may increase die area and cost of the processor.

In these systems, after obtaining the variable length instructions and the corresponding endbits, the instruction decode unit of the processor core typically confirms that the endbits correctly identify the boundaries of the variable length instructions using a length decode unit. For x86 architectures, the instructions can have a wide range of lengths (e.g., 1-15 bytes) and the instructions can start/end on any byte boundary (or alignment). Therefore, it is especially important in x86 architectures to verify that the endbits correctly identify the instruction boundaries, because if the same instruction bytes are decoded from two different start positions, two entirely different sets of instructions may be obtained.

During the verification process, if the endbits are determined to be correct, the instruction decode unit usually begins to fully decode the instructions and eventually dispatches the decoded instructions to the execution unit. If the endbits are determined to be corrupted, the instruction decode unit typically decodes the instructions at a much slower rate since it may need to repair or recalculate the endbits to identify the instruction boundaries. In these systems, the decode mechanism may be relatively complex since it needs circuitry to confirm all of the endbits and additional circuitry to repair or recalculate corrupted endbits.

SUMMARY

Various embodiments are disclosed of a mechanism for superscalar decode of variable length instructions. The decode mechanism may be included within a processing unit and may comprise a length decode unit. During operation, the length decode unit may obtain a plurality of instruction bytes from an instruction buffer. The instruction bytes may be associated with a plurality of variable length instructions, which are scheduled to be executed by the processing unit. The length decode unit may perform a length decode operation for each of the plurality of instruction bytes. For each instruction byte, the length decode unit may estimate the instruction length of a current variable length instruction associated with a current instruction byte. In one embodiment, the length decode unit may estimate the instruction length of the current variable length instruction associated with the current instruction byte based on the assumption that the current instruction byte is the start of the current variable length instruction. Furthermore, during the length decode operation, for each instruction byte, the length decode unit may estimate the start of a next variable length instruction based on the estimated instruction length of the current variable length instruction, and store a first pointer to the estimated start of the next variable length instruction.

In some embodiments, the length decode unit may obtain a plurality of instruction bytes based on a scan window of a predetermined size. Each instruction byte may be associated with a byte position within the scan window. In these embodiments, for each instruction byte, the length decode unit may estimate a byte position corresponding to the start of the next variable length instruction based on the estimated instruction length of the current variable length instruction and a byte position associated with the current instruction byte. Furthermore, for each instruction byte, the length decoder may store a first pointer to the byte position corresponding to the estimated start of the next variable length instruction.

Figure 1A:
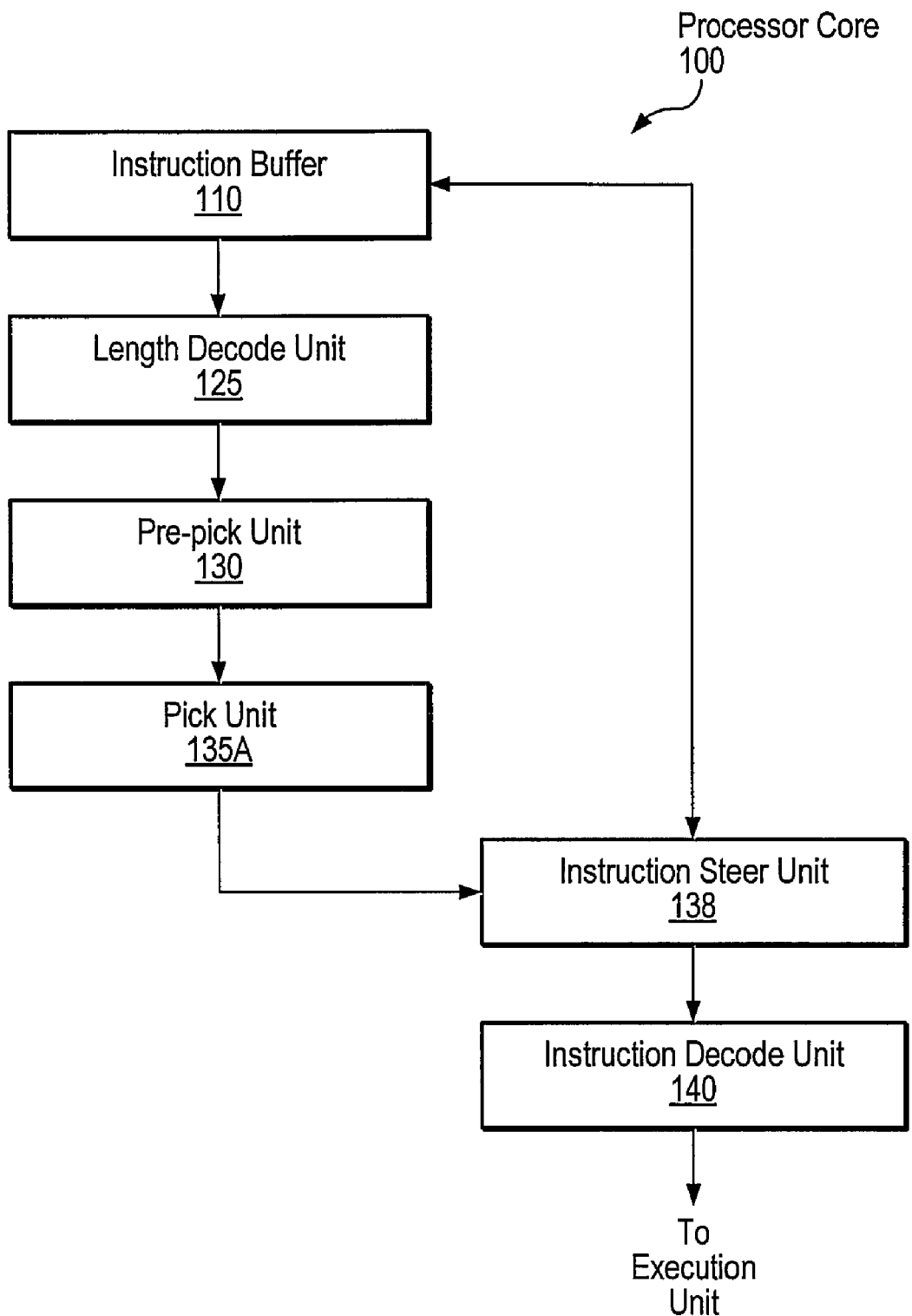
FIG. 1A is a block diagram of one embodiment of an exemplary front end of a processor core.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1B:
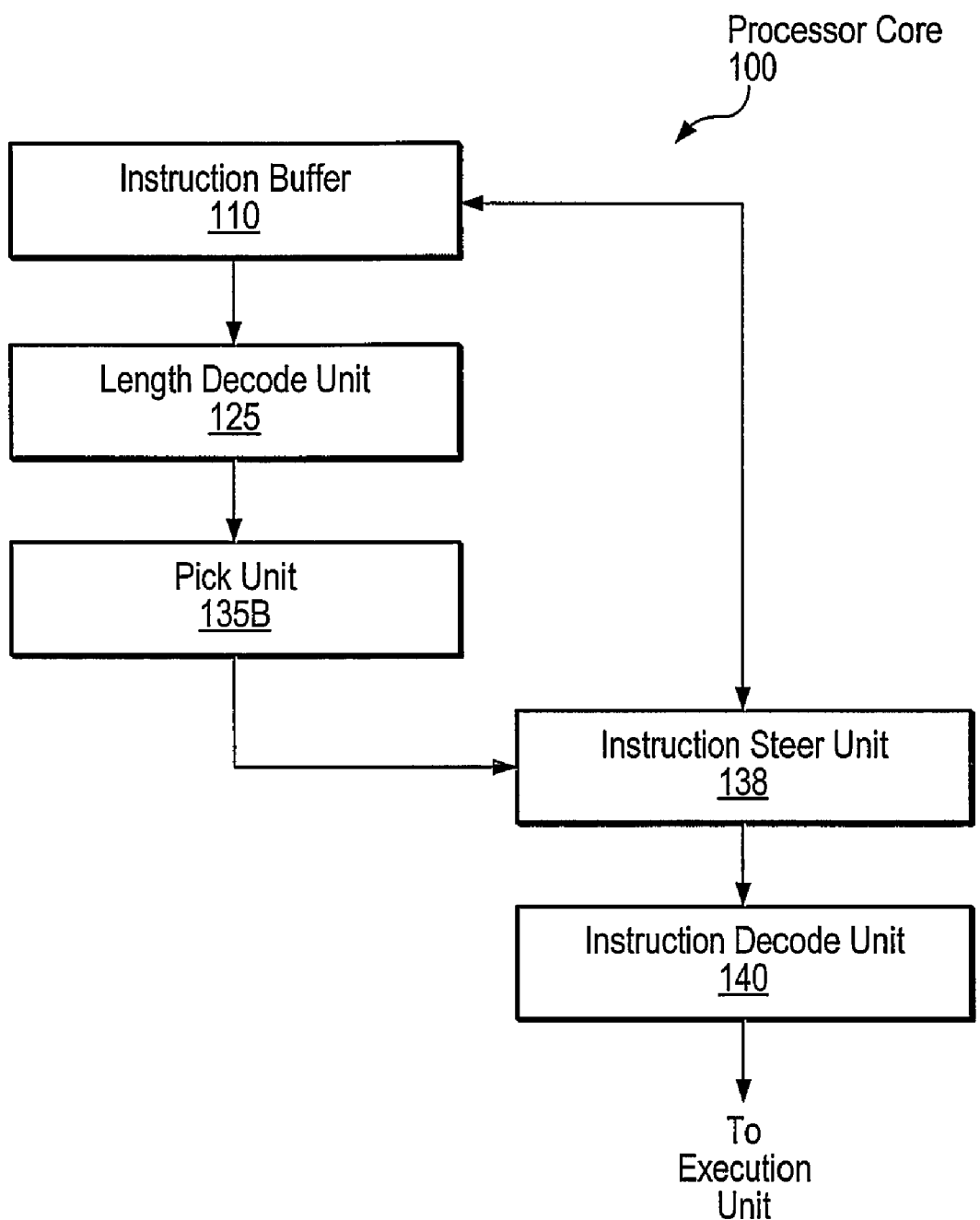
FIG. 1B is a block diagram of another embodiment of an exemplary front end of a processor core.

Turning now to FIG. 1A, a block diagram of one embodiment of an exemplary front end of a processor core 100 is shown. As illustrated, the processor core 100 may include an instruction buffer 110, a length decode unit 125, a pre-pick unit 130, a pick unit 135A, an instruction steer unit 138, and an instruction decode unit (DEC) 140. FIG. 1B is a block diagram of another embodiment of an exemplary front end of processor core 100. In the embodiment shown in FIG. 1B, processor core 100 does not include pre-pick unit 130 and therefore includes a modified version of the pick unit of FIG. 1A, i.e., pick unit 135B.

Figure 6:
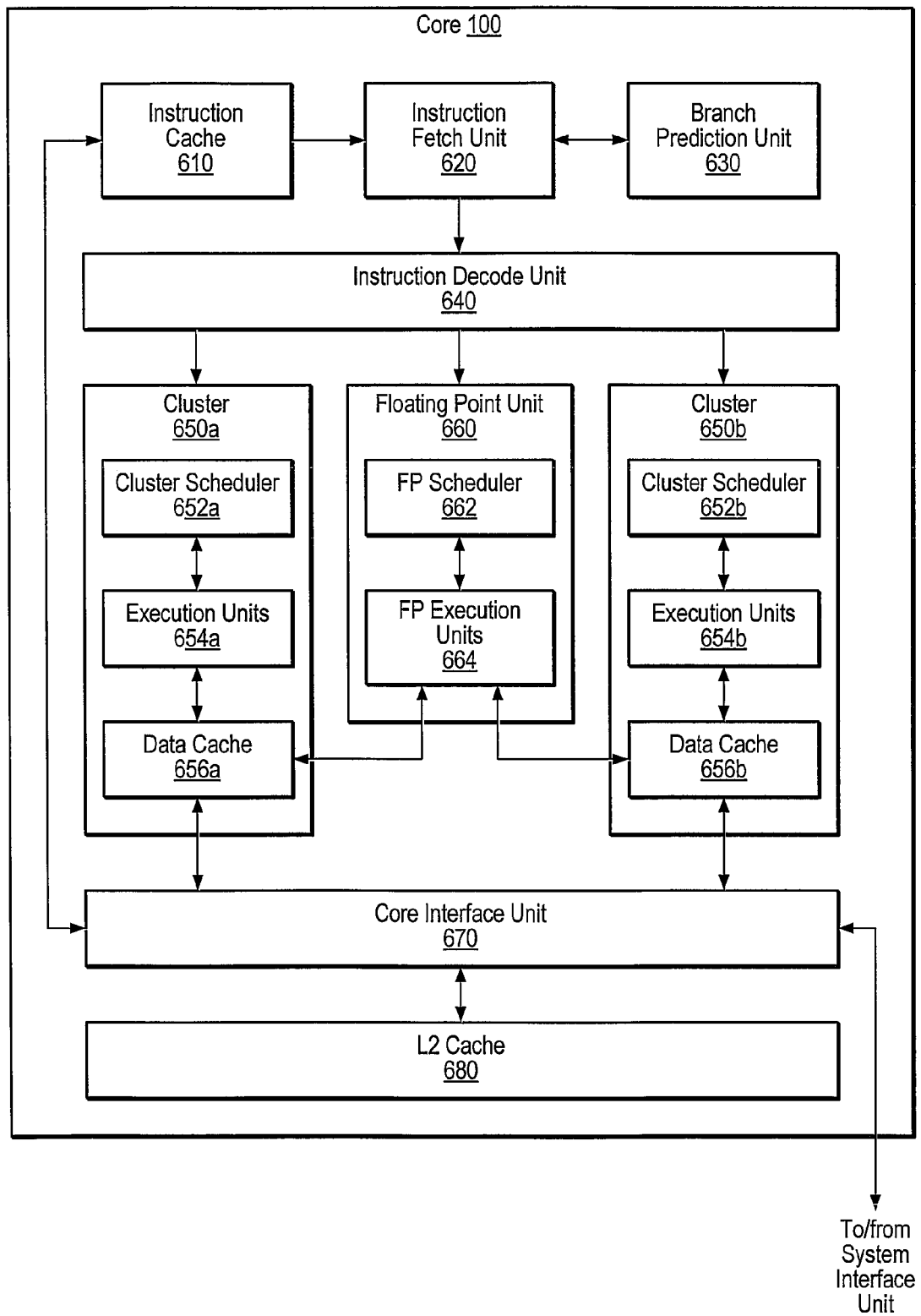
FIG. 6 is a block diagram of one embodiment of a processor core.

Instruction buffer 110 may store instructions bytes associated with a plurality of variable length instructions, which are scheduled to be executed by the processing core 100. In one embodiment, the instructions may be provided to the instruction buffer 110 for temporary storage after being fetched from an instruction cache, such as an L1 cache, located within processor core 100, e.g., as illustrated in FIG. 6.

During operation, length decode unit 125 may obtain a plurality of the instruction bytes from instruction buffer 110. In various embodiments, length decode unit 125 may obtain a plurality of instruction bytes from instruction buffer 110 based on a scan window of a predetermined size 'X', for example, a scan window 32 bytes wide. The instruction bytes may be associated with a plurality of variable length instructions, which are to be executed by the processing core 100. Specifically, each of the variable length instructions may comprise one or more of the instruction bytes.

Length decode unit 125 may perform a length decode operation for each of the plurality of instruction bytes within the scan window. Specifically, for each instruction byte, length decode unit 125 may estimate an instruction length of the current variable length instruction associated with the current instruction byte. Furthermore, during the length decode operation, for each instruction byte, length decode unit 125 may estimate the start of the next variable length instruction based on the estimated instruction length, and store a first pointer to the estimated start of the next instruction. Length decode unit 125 will be further described below with reference to FIG. 2.

As described above with reference to FIG. 1A, in various embodiments, processor core 100 may include pre-pick unit 130, which may be connected to access the plurality of first pointers generated by length decode unit 125. For each instruction byte, pre-pick unit 130 may use the first pointer indicating the estimated start of the next variable length instruction to estimate the start of a subsequent variable length instruction following the next instruction, and store, for each instruction byte, a second pointer to the estimated start of the subsequent instruction within the scan window. Pre-pick unit 130 of FIG. 1A will be further described below with reference to FIG. 3.

In the embodiment shown in FIG. 1A, pick unit 135A may be connected to access the plurality of first and second pointers generated by length decode unit 125 and pre-pick unit 130, respectively. Pick unit 135A may determine the actual start of the variable length instructions within the scan window based on a start pointer and a plurality of related first and second pointers, and generate an instruction pointer for each instruction. Pick unit 135A of FIG. 1A will be further described below with reference to FIG. 4A.

As described above with reference to FIG. 1B, in some embodiments, processor core 100 may include pick unit 135B, which may be connected to access the plurality of first pointers generated by length decode unit 125. Pick unit 135B may determine the actual start of the variable length instructions within the scan window based on a start pointer and a plurality of related first pointers, and generate an instruction pointer for each instruction. Pick unit 135B of FIG. 1B will be further described below with reference to FIG. 4B.

Instruction steer unit 138 may obtain location information about the variable length instructions, e.g., instruction pointers, from pick unit 135A (or 135B), and may access instruction buffer 110 to obtain the instructions. Instruction steer unit 138 may then provide the variable length instructions to DEC 140. DEC 140 may decode the instructions and store the decoded instructions in a buffer until the instructions are dispatched to an execution unit. DEC 140 will be further described below with reference to FIG. 6.

In various embodiments, processing core 100 may be comprised in any of various types of computing or processing systems, e.g., a workstation, a personal computer (PC), a server blade, a portable computing device, a game console, a system-on-a-chip (SoC), a television system, an audio system, among others. For instance, in one embodiment, processing core 100 may be included within a processor that is connected to a circuit board or motherboard of a computing system. As described below with reference to FIG. 6, processor core 100 may be configured to implement a version of the x86 instruction set architecture (ISA). It is noted, however, that in other embodiments core 100 may implement a different ISA or a combination of ISAs. In some embodiments, processor core 100 may be one of multiple processor cores included within the processor of a computing system, as will be further described below with reference to FIG. 7.

It should be noted that the components described with reference to FIGS. 1A and 1B are meant to be exemplary only, and are not intended to limit the invention to any specific set of components or configurations. For example, in various embodiments, one or more of the components described may be omitted, combined, modified, or additional components included, as desired. For instance, in some embodiments, instruction steer unit 138 may be physically located within DEC 140.

Figure 2:
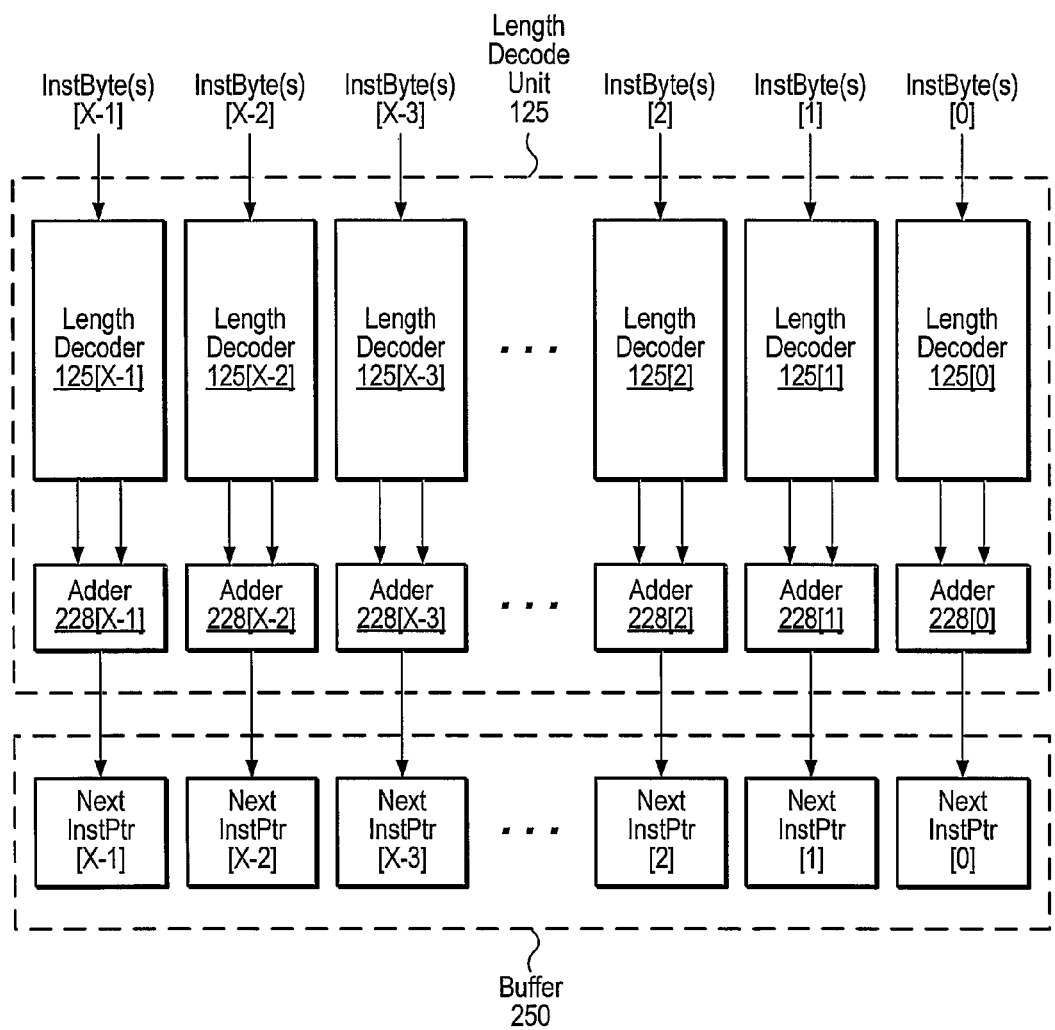
FIG. 2 is a block diagram of one embodiment of a length decode unit.

FIG. 2 is a block diagram of one embodiment of length decode unit 125. Length decode unit 125 may receive the plurality of instruction bytes, i.e., InstByte[0]-InstByte[X−1], within the scan window of the predetermined size 'X'. As illustrated, in one specific implementation, length decode unit 125 may include a plurality of parallel length decoders 125[0]-125[X−1], each connected to receive at least a corresponding one of the instruction bytes. For example, if the scan window is 32 bytes wide, length decode unit 125 may receive 32 instruction bytes, and each length decoder of the unit 125 may receive at least the corresponding one of the 32 instruction bytes.

Length decode unit 125 may perform a length decode operation for each of the plurality of instruction bytes (InstBytes[0]-[X−1]), e.g., using the corresponding length decoders 125[0]-[X−1]. In some embodiments, length decode unit 125 may perform a length decode operation for each of the plurality of instruction bytes simultaneously, e.g., using the corresponding length decoders 125[0]-[X−1]. Each of the length decoders 125[0]-[X−1] of length decode unit 125 may receive at least a corresponding one of the plurality of instruction bytes, i.e., the current instruction byte. In other words, for each length decoder the current instruction byte is a corresponding one of the plurality of instruction bytes obtained from the instruction buffer. In some embodiments, each length decoder may receive one or more additional instruction bytes. As described above, the instruction bytes are associated with a plurality of variable length instructions within the scan window. For each instruction byte, length decode unit 125 may estimate an instruction length of the current variable length instruction associated with the current instruction byte. Length decode unit 125 may estimate, for each instruction byte, the instruction length of the current variable length instruction associated with the current instruction byte based on the assumption that the current instruction byte is the start of the current variable length instruction.

Specifically, each of the length decoders 125[0]-[X−1] may perform a length decode operation for a corresponding one of the plurality of instruction bytes, i.e., the current instruction byte. For example, length decoder 125[8] may perform a length decode operation for its current byte Inst-Byte[8], length decoder 125[9] may perform a length decode operation for its current byte InstByte[9], and length decoder 125[10] may perform a length decode operation for its current byte InstByte[10]. If InstByte[8] and InstByte[9] are both associated with a first variable length instruction within the scan window and InstByte[10] is associated with a second variable length instruction, for InstByte[8], length decode unit 125 may estimate the instruction length of the first variable length instruction by assuming that InstByte[8] is the first instruction byte of the instruction, and for InstByte[9], by assuming that InstByte[9] is the first instruction byte of the first instruction. For InstByte[10], length decode unit 125 may estimate the instruction length of the second variable length instruction by assuming that InstByte[10] is the first instruction byte of the second instruction.

In various embodiments, each of the length decoders 125[0]-[X−1] may receive the corresponding one of the plurality of instruction bytes, i.e., the current instruction byte, and one or more subsequent instruction bytes within the scan window to estimate the instruction length of the current variable length instruction. For instance, in the example described above, length decoder 125[8] may receive the current byte InstByte[8], and also InstBytes[9]-[12] to estimate the instruction length of the current variable length instruction. In other words, in these embodiments, each length decoder 125[0]-[X−1] may estimate the instruction length of the current variable length instruction associated with the current instruction byte based on the current instruction byte, and the one or more subsequent instruction bytes within the scan window.

As shown in FIG. 2, each instruction byte is associated with a byte position within the scan window of predetermined size 'X'. During the length decode operation, for each instruction byte, length decode unit 125 may also estimate a byte position corresponding to the start of the next variable length instruction within the scan window based on the estimated instruction length of the current variable length instruction and a byte position associated with the current instruction byte. Specifically, in one embodiment, length decode unit 125 may add the estimated instruction length to the byte position associated with the current instruction byte to estimate a byte position corresponding to the start of the next variable length instruction. In one example, when performing the length decode operation for InstByte[3], if the estimated instruction length of the current variable length instruction is determined to be 5 bytes, length decode unit 125 may add the estimated instruction length, or '5', to the byte position associated with the current instruction byte InstByte[3] to derive the byte position associated with InstByte[8], which is an estimate of the start of the next variable length instruction.

In one specific implementation, length decode unit 125 may include a plurality of adders, e.g., adders 228[0]-[X−1] shown in FIG. 2, to perform the addition operations. Since this operation is performed for each instruction byte in the scan window, and since each variable length instruction may be larger than one byte, at this point it is noted that the result may just be an estimate of the start of the next variable length instruction.

Furthermore, for each instruction byte, length decode unit 125 may store a first or "next" pointer to the byte position corresponding to the estimated start of the next variable length instruction. In various embodiments, e.g., as illustrated in FIG. 2, length decode unit 125 may store the first or "next" pointers (e.g., NextInstPtr[0]-NextInstPtr[X−1]) for each of the instruction bytes in a buffer 250, which is accessible to various components of the front end of processor core 100. For example, when performing the length decode operation for InstByte[3], length decode unit 125 may have estimated that the start of the next variable length instruction was the byte position associated with InstByte[8]. In this example, length decode unit 125 may store a first pointer, e.g., NextInstPtr[3], that points to the byte position associated with Inst-Byte[8], which corresponds to the start of the next variable length instruction.

In some embodiments, for each instruction byte, the first pointer calculated for a current instruction byte may be stored in a location within buffer 250 that is related to the byte position associated with the current instruction byte. For instance, in the above example, the first pointer for instruction byte InstByte[3] may be stored in a buffer location related to the fourth byte position within a scan window 'X' bytes wide, which is associated with instruction byte InstByte[3]. As noted above, this process may be performed for each instruction byte within the scan window simultaneously. After the length decode operation, buffer 250 may include a plurality of first pointers, e.g., NextInstPtr[0]-NextInstPtr[X−1], or one pointer for each of the byte positions and associated instruction byte within the scan window.

It should be noted that the components described with reference to FIG. 2 are meant to be exemplary only, and are not intended to limit the invention to any specific set of components or configurations. For example, in various embodiments, one or more of the components described may be omitted, combined, modified, or additional components included, as desired. For instance, in some embodiments, length decode unit 125 may include other mechanisms instead of or in addition to the plurality of adders 228 for performing the addition operation and estimating the start of the variable length instructions.

Figure 3:
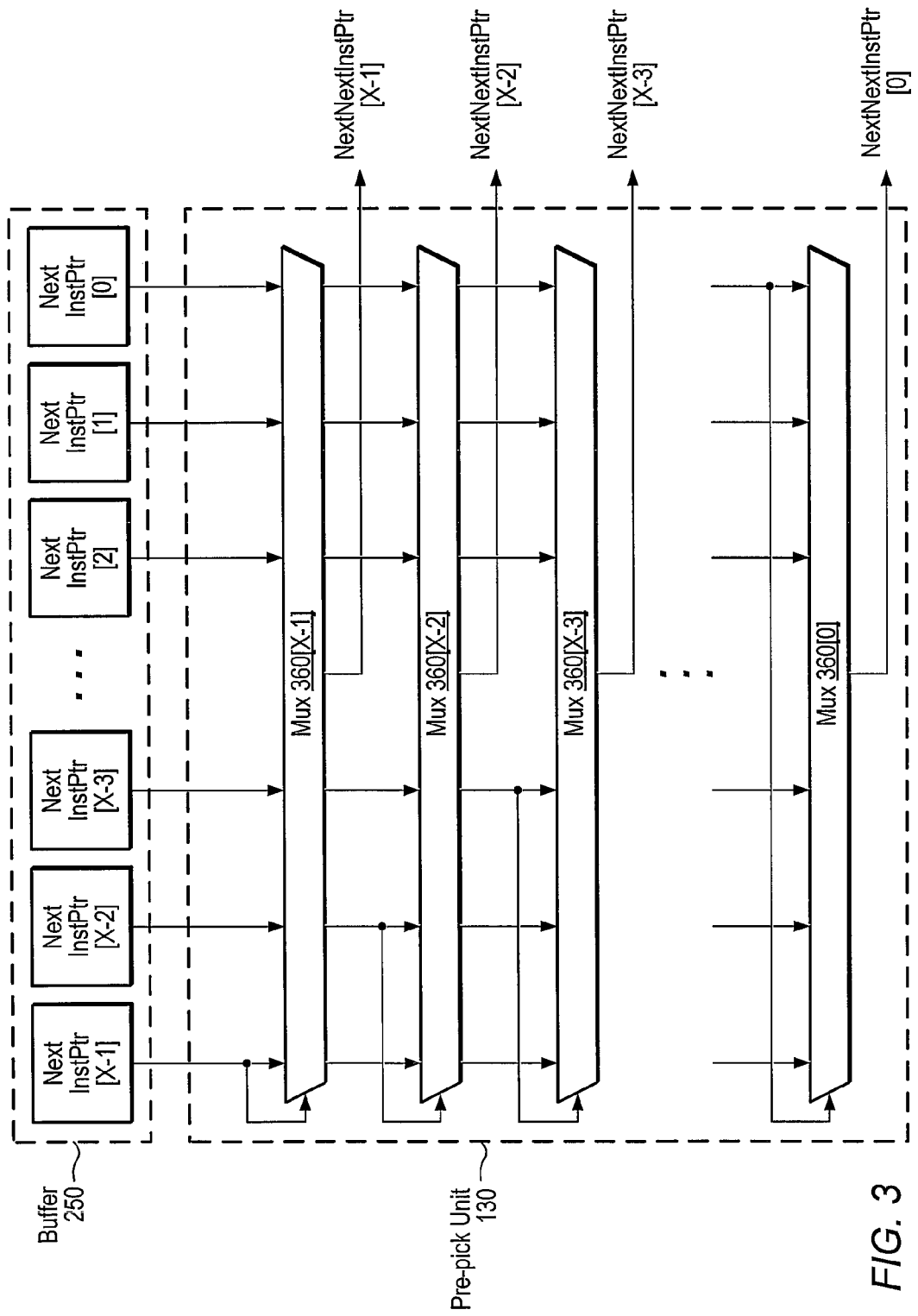
FIG. 3 is a block diagram of one embodiment of a pre-pick unit.

FIG. 3 is a block diagram of one embodiment of a pre-pick unit 130. As illustrated, pre-pick unit 130 may include a plurality of multiplexers (muxes), i.e., muxes 360[0]-[X−1]. Specifically, in one specific implementation, the number of mux stages within pre-pick unit 130 may be based on the size of the scan window. As shown in FIG. 3, pre-pick unit 130 may be connected to buffer 250 to access the plurality of first or "next" pointers generated by length decode unit 125 via the muxes 360.

For each instruction byte, pre-pick unit 130 may obtain the corresponding first pointer, indicating the estimated start of the next variable length instruction, from buffer 250 and use this pointer to estimate the start of a subsequent variable length instruction following the next variable length instruction within the scan window. Specifically, each of the muxes 360 may obtain the first pointer and use this pointer to select the first pointer associated with the byte position corresponding to the estimated start of the next variable length instruction. With reference to the current instruction byte, the selected first pointer associated with the byte position corresponding to the estimated start of the next variable length instruction may indicate the estimated start of a subsequent variable length instruction following the next variable length instruction. For example, for InstByte[3], pre-pick unit 130 may use the first pointer associated with the byte position of InstByte[3] as a control signal to select (e.g., using mux 360[3]) the first pointer associated with the byte position of InstByte[8] (i.e., the estimated start of the next variable length instruction). In this example, the selected first pointer associated with the byte position of InstByte[8] may point to the byte position within the scan window corresponding to InstByte[12]. Therefore, in this example, with reference to InstByte[3], the estimated start of a subsequent variable length instruction following the next variable length instruction may be the byte position associated with InstByte[12].

Furthermore, as illustrated in FIG. 3, pre-pick unit 130 may store, for each instruction byte, a second pointer to the byte position corresponding to the estimated start of the subsequent variable length instruction following the next variable length instruction within the scan window. In various embodiments, pre-pick unit 130 may store the second or "next-next" pointers (e.g., NextNextInstPtr[0]-NextNextInstPtr[X−1]) for each of the instruction bytes in buffer 250. For instance, in the above example concerning InstByte[3], in addition to storing a first pointer, e.g., NextInstPtr[3], that points to the byte position associated with InstByte[8], which corresponds to the start of the next variable length instruction, pre-pick unit 130 may store a second pointer, e.g., NextNextInstPtr[3], that points to the byte position associated with InstByte[12], which corresponds to the start of the subsequent variable length instruction.

Similar to the first pointers, in various embodiments, for each instruction byte, the second pointer calculated for a current instruction byte may be stored in a location within buffer 250 that is related to the byte position associated with the current instruction byte. For instance, in the above example, the second pointer for instruction byte InstByte[3] may be stored in a buffer location related to the fourth byte position within a scan window 'X' bytes wide, which is associated with instruction byte InstByte[3]. In some embodiments, this process may be performed for each instruction byte within the scan window simultaneously. After the pre-pick operation, buffer 250 may include a plurality of first or "next" pointers, e.g., NextInstPtr[0]-NextInstPtr[X−1], and a plurality of second or "next-next" pointers, e.g., NextNextInstPtr[0]-NextNextInstPtr[X−1], or two pointers for each of the byte positions and associated instruction byte within the scan window.

It should be noted that the components described with reference to FIG. 3 are meant to be exemplary only, and are not intended to limit the invention to any specific set of components or configurations. For example, in various embodiments, one or more of the components described may be omitted, combined, modified, or additional components included, as desired. For instance, in some embodiments, pre-pick unit 130 may include other mechanisms instead of or in addition to the muxes 360 for generating the second pointers.

Figure 4A:
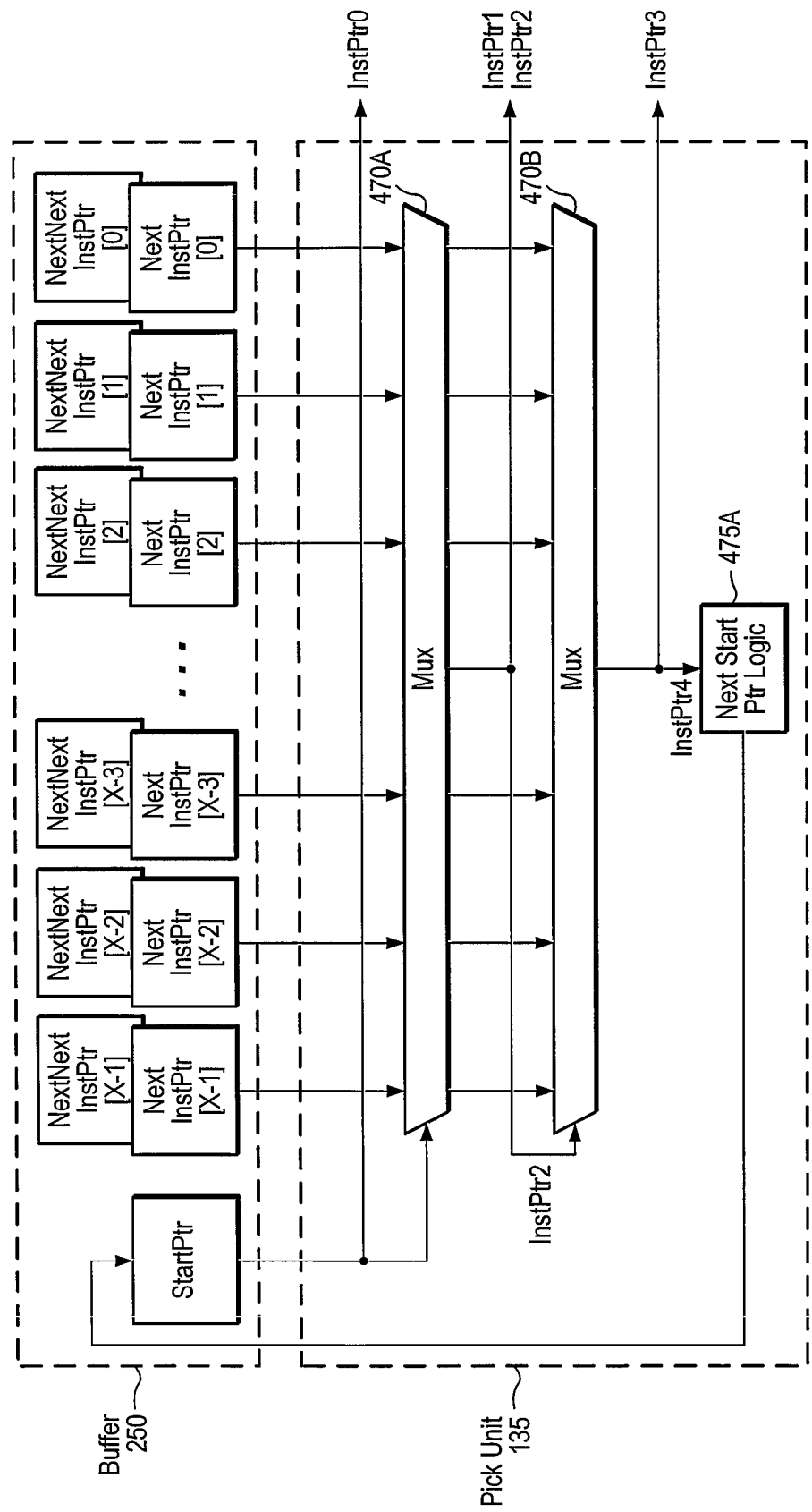
FIG. 4A is a block diagram of one embodiment of a pick unit shown in FIG. 1A.

FIG. 4A is a block diagram of one embodiment of pick unit 135A shown in FIG. 1A. As illustrated, in one specific implementation, pick unit 135A may include multiplexers (muxes) 470A-B and next start pointer logic 475A. Pick unit 135A may be connected to buffer 250 to access the plurality of first (or "next") pointers and second (or "next-next") pointers generated by length decode unit 125 and pre-pick unit 130, respectively, which indicate the estimated start of the variable length instructions within the scan window. Pick unit 135A may determine the actual start of the variable length instructions based on a start pointer and a plurality of related first and second pointers, and generate instruction pointers (e.g., InstPtr0-InstPtr4 shown in FIG. 4A) that point to the actual start of the variable length instructions.

Pick unit 135A may obtain a start pointer from a memory, e.g., buffer 250. The start pointer may point to the instruction byte corresponding to the actual start of the first variable length instruction within the scan window. In one embodiment, the start pointer may be determined based on the instructions that are fetched from the instruction cache and on a prediction scheme. The start pointer may be known whenever instructions are obtained from the target of a taken branch, according to the prediction scheme. That is, the start pointer may be associated with the target address of the taken branch.

After determining the actual start of the first variable length instruction using the start pointer and generating the instruction pointer (e.g., InstPtr0), pick unit 135A may use a plurality of related first and second pointers, starting with the first and second pointers associated with the instruction byte corresponding to the actual start of the first variable length instruction, to determine the actual start of the remaining variable length instructions within the scan window. First, pick unit 135A may use the first and second pointers associated with the instruction byte corresponding to the actual start of the first variable length instruction to determine the start of the second and third variable length instructions within the scan window, and generate the corresponding instruction pointers (e.g., InstPtr1 and InstPtr2). Then, pick unit 135A may use the first and second pointers associated with the instruction byte corresponding to the start of the third variable length instruction to determine the start of the fourth and fifth variable length instruction within the scan window, and generate the corresponding instruction pointers (e.g., InstPtr3 and InstPtr4).

It is noted that the plurality of related first and second pointers (i.e., related "next" and "next-next" pointers) may be defined as the pointers that are used by pick unit 135A to determine the actual start of the variable length instructions within the scan window. For instance, in the embodiment of FIG. 4A, the first and second pointers associated with the byte position corresponding to the start of the first variable length instruction may be used to determine InstPtr1, which points to the start of the second variable length instruction, and InstPtr2, which points to the start of the third variable length instruction within the scan window. Furthermore, the first and second pointers associated with the byte position corresponding to the start of the third variable length instruction may be used to determine InstPtr3, which points to the start of the fourth variable length instruction, and InstPtr4, which points to the start of the fifth variable length instruction within the scan window. These first and second pointers, along with the other first and second pointers used by pick unit 135A to determine the actual start of the remaining instructions within the scan window, may be defined as the related first and second pointers.

In one specific implementation, as illustrated in FIG. 4A, pick unit 135A may determine the actual start of four variable length instructions per cycle. In this implementation, the start pointer is used to generate InstPtr0, and is also used by mux 470A, along with the corresponding first and second pointers, to generate InstPtr1 and InstPtr2. Then, InstPtr2 is used by mux 470B, along with the corresponding first and second pointers, to generate InstPtr3 and InstPtr4. Pick unit 135A may repeat this process, or loop, various times until pick unit 135A determines the actual start of the remaining variable length instructions within the scan window. Since InstPtr4 is the last generated instruction pointer for each loop, next start pointer logic 475A may store InstPtr4 in buffer 250 each time and designate InstPtr4 as the next start pointer for the next loop. This process enables superscalar instruction decode of variable length instructions.

In some cases, these steps do not result in four valid instruction pointers, i.e., InstPtr0-InstPtr4. In these cases, pick unit 135A may use the last valid instruction pointer as the next start pointer for the next loop. For instance, in one example, these steps may only result in two instruction pointers (InstPtr0 and InstPtr2), e.g., if the process has reached the end of this particular scan window. In this example, pick unit 135A may designate InstPtr2 as the next start pointer for the next loop. Specifically, in this example, InstPtr2 may serve as the next start pointer for the instruction bytes obtained based on a next scan window of predetermined size 'X'. In other words, similar to the start pointer of the previous scan window, this start pointer may point to the actual start of the first variable length instruction within the next scan window.

It is noted, however, that in other embodiments the components of processor core 100 may determine the actual start of two or eight variable length instructions per cycle (or other quantities). In other words, the design may be scalable to meet various specifications, as desired. For instance, in these embodiments, processor core 100 may be designed to include additional logic to calculate third and fourth pointers for each instruction byte, which may be used by the corresponding pick unit to determine eight variable length instructions per cycle, for example.

As illustrated in FIG. 1A, after generating the instruction pointers (e.g., InstPtr0-InstPtr4), instruction steer unit 138 may obtain the instruction pointers from pick unit 135A, and may access instruction buffer 110 to obtain the variable length instructions. Instruction steer unit 138 may then provide the instructions to DEC 140. DEC 140 may decode the instructions and store the decoded instructions in a buffer until the instructions are dispatched to an execution unit, e.g., as will be further described below with reference to FIG. 6.

It should be noted that the components described with reference to FIG. 4A are meant to be exemplary only, and are not intended to limit the invention to any specific set of components or configurations. For example, in various embodiments, one or more of the components described may be omitted, combined, modified, or additional components included, as desired. For instance, in one embodiment, processor core 100 may be designed without pre-pick unit 130, as will be further described below with reference to FIG. 4B.

Figure 4B:
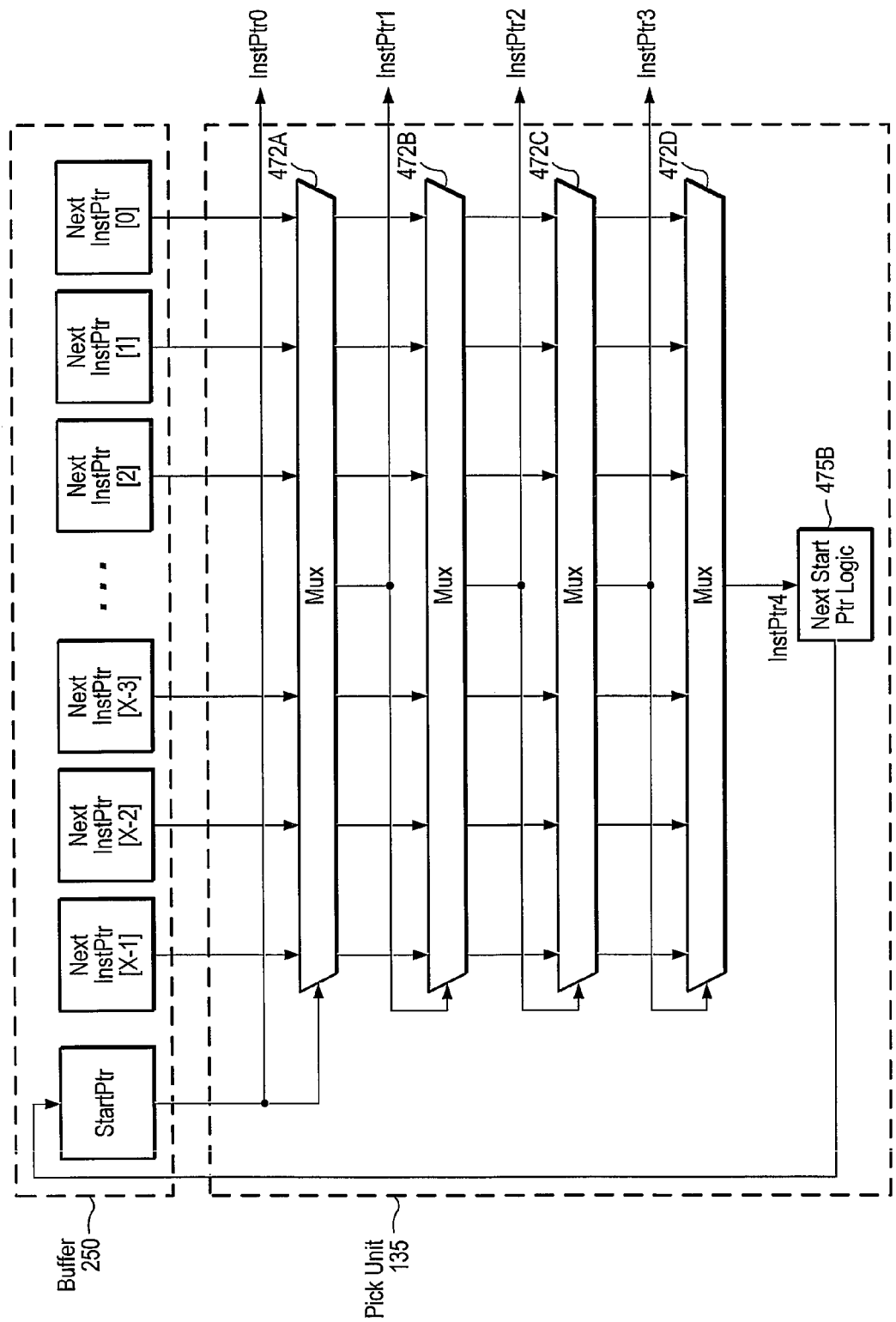
FIG. 4B is a block diagram of one embodiment of a pick unit shown in FIG. 1B.

FIG. 4B is a block diagram of one embodiment of pick unit 135B shown in FIG. 1B. As illustrated, in one specific implementation, pick unit 135B may include multiplexers (muxes) 472A-D and next start pointer logic 475B. Pick unit 135B may be connected to buffer 250 to access the plurality of first (or "next") pointers generated by length decode unit 125, which indicate the estimated start of the variable length instructions within the scan window. Pick unit 135B may determine the actual start of the variable length instructions based on a start pointer and a plurality of related first pointers, and generate instruction pointers (e.g., InstPtr0-InstPtr4 shown in FIG. 4A) that point to the actual start of the variable length instructions.

Pick unit 135B may obtain the start pointer from a memory, e.g., buffer 250. The start pointer may point to the instruction byte corresponding to the actual start of the first variable length instruction within the scan window. After determining the actual start of the first variable length instruction using the start pointer and generating the instruction pointer (e.g., InstPtr0), pick unit 135B may use a plurality of related first pointers, starting with the first pointer associated with the instruction byte corresponding to the actual start of the first variable length instruction, to determine the actual start of the remaining variable length instructions within the scan window. First, pick unit 135B may use the first pointer associated with the instruction byte corresponding to the actual start of the first variable length instruction to determine the start of the second variable length instruction within the scan window, and generate the corresponding instruction pointer (e.g., InstPtr1). Then, pick unit 135B may use the first pointer associated with the instruction byte corresponding to the start of the second variable length instruction to determine the start of the third variable length instruction within the scan window, and generate the corresponding instruction pointer (e.g., InstPtr2). Pick unit 135B may continue to perform the same process for the rest of the variable instruction pointers within the scan window to generate the rest of the instruction pointers (e.g., InstPtr3 and InstPtr4).

It is noted that the plurality of related first pointers (i.e., related "next" pointers) may be defined as the pointers that are used by pick unit 135B to determine the actual start of the variable length instructions within the scan window. For instance, in the embodiment of FIG. 4B, the first pointer associated with the byte position corresponding to the start of the first variable length instruction may be used to determine InstPtr1, which points to the start of the second variable length instruction within the scan window. Furthermore, the first pointer associated with the byte position corresponding to the start of the second variable length instruction may be used to determine InstPtr2, which points to the start of the third variable length instruction within the scan window, etc. These first pointers, along with the other first pointers used by pick unit 135B to determine the actual start of the remaining instructions within the scan window, may be defined as the related first pointers.

In one specific implementation, as illustrated in FIG. 4B, the start pointer is used to generate InstPtr0, and is also used by mux 472A, along with the corresponding first pointer, to generate InstPtr1. InstPtr1 is used by mux 472B, along with the corresponding first pointer, to generate InstPtr2. InstPtr2 is used by mux 472C, along with the corresponding first pointer, to generate InstPtr3. InstPtr3 is used by mux 472D, along with the corresponding first pointer, to generate InstPtr4. Pick unit 135B may repeat this process, or loop, various times until pick unit 135B determines the actual start of the remaining variable length instructions within the scan window. Since InstPtr4 is the last generated instruction pointer for each loop, next start pointer logic 475B may store InstPtr4 in buffer 250 each time and designate InstPtr4 as the next start pointer for the next loop.

In some cases, these steps do not result in four valid instruction pointers, i.e., InstPtr0-InstPtr4. In these cases, pick unit 135B may use the last valid instruction pointer as the next start pointer for the next loop. For instance, in one example, these steps may only result in three instruction pointers (InstPtr0-InstPtr3). In this example, pick unit 135B may designate InstPtr3 as the next start pointer for the next loop. Specifically, in this example, InstPtr3 may serve as the next start pointer for the instruction bytes obtained based on a next scan window of predetermined size 'X'. In other words, similar to the start pointer of the previous scan window, this start pointer may point to the actual start of the first variable length instruction within the next scan window.

It should be noted that the components described with reference to FIG. 4B are meant to be exemplary only, and are not intended to limit the invention to any specific set of components or configurations. For example, in various embodiments, one or more of the components described may be omitted, combined, modified, or additional components included, as desired.

Figure 5A:
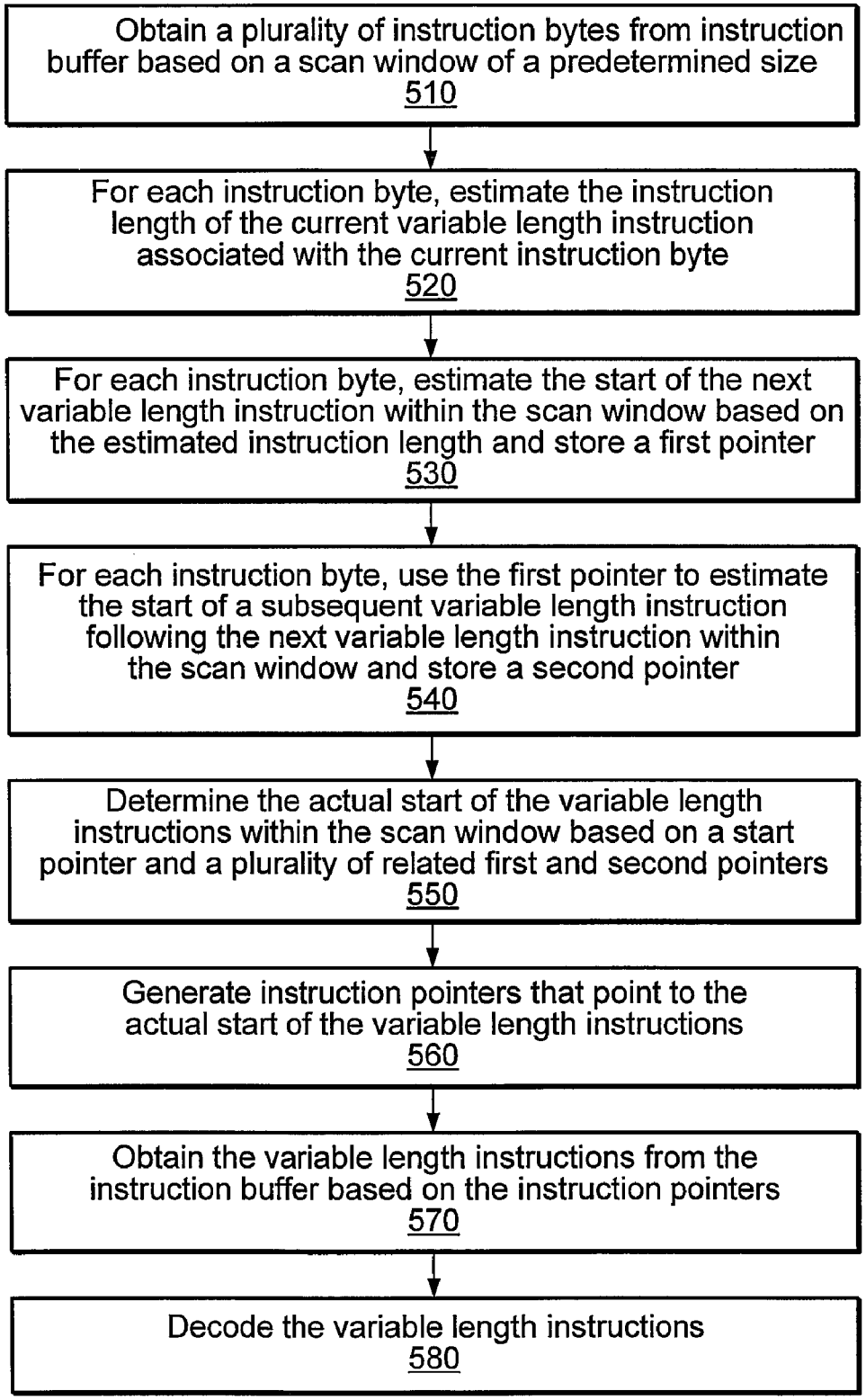
FIG. 5A is a flow diagram illustrating a method for length decoding and identifying boundaries of a plurality of variable length instruction, according to one embodiment.

FIG. 5A is a flow diagram illustrating a method for length decoding and identifying boundaries of a plurality of variable length instruction, according to one embodiment. It should be noted that in various embodiments, some of the steps shown may be performed concurrently, in a different order than shown, or omitted. Additional steps may also be performed as desired.

Referring collectively to FIGS. 1A, 2, 3, 4A, and 5A, length decode unit 125 may obtain a plurality of instruction bytes from instruction buffer 110 based on a scan window of a predetermined size (block 510). For each instruction byte, length decode unit 125 may estimate the instruction length of the current variable length instruction associated with the current instruction byte (block 520). Then, for each instruction byte, length decode unit 125 may estimate the start of the next variable length instruction within the scan window based on the estimated instruction length and store a first pointer (block 530).

Pre-pick unit 130 may, for each instruction byte, use the first pointer indicating the estimated start of the next variable length instruction to estimate the start of a subsequent variable length instruction following the next variable length instruction within the scan window and store a second pointer (block 540). Pick unit 135A may determine the actual start of the variable length instructions within the scan window based on a start pointer and a plurality of related first and second pointers (block 550), and generate instruction pointers that point to the actual start of the variable length instructions (block 560). Instruction steer unit 138 may obtain the variable length instructions from instruction buffer 110 based on the instruction pointers (block 570). DEC 140 may obtain the variable length instructions from steer unit 138 and decode the instructions (block 580).

Figure 5B:
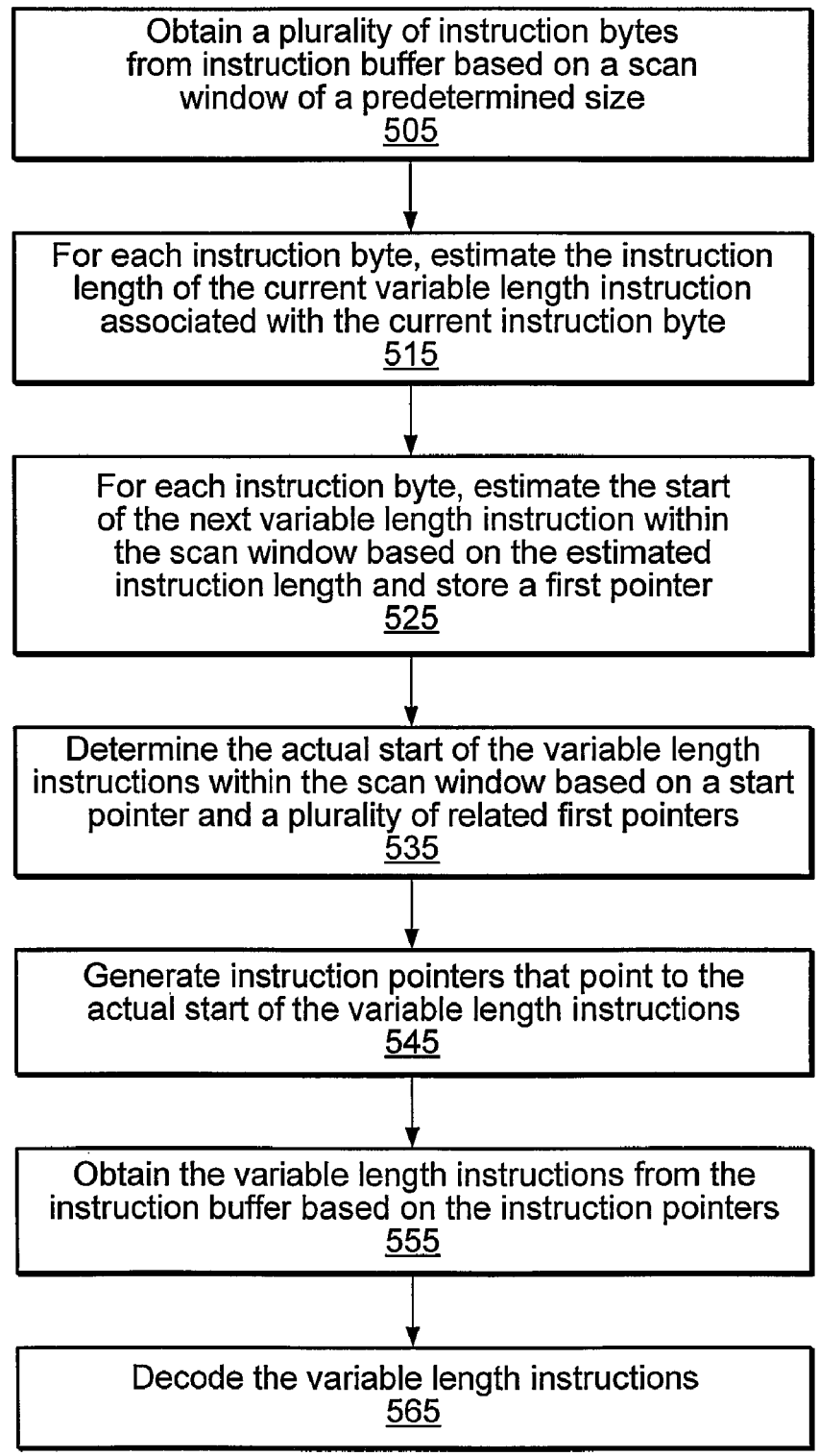
FIG. 5B is a flow diagram illustrating a method for length decoding and identifying boundaries of a plurality of variable length instruction, according to another embodiment.

FIG. 5B is a flow diagram illustrating a method for length decoding and identifying boundaries of a plurality of variable length instruction, according to another embodiment. It should be noted that in various embodiments, some of the steps shown may be performed concurrently, in a different order than shown, or omitted. Additional steps may also be performed as desired.

Referring collectively to FIGS. 1B, 2, 3, 4B, and 5B, length decode unit 125 may obtain a plurality of instruction bytes from instruction buffer 110 based on a scan window of a predetermined size (block 505). For each instruction byte, length decode unit 125 may estimate the instruction length of the current variable length instruction associated with the current instruction byte (block 515). Then, for each instruction byte, length decode unit 125 may estimate the start of the next variable length instruction within the scan window based on the estimated instruction length and store a first pointer (block 525).

Pick unit 135B may determine the actual start of the variable length instructions within the scan window based on a start pointer and a plurality of related first pointers (block 535), and generate instruction pointers that point to the actual start of the variable length instructions (block 545). Instruction steer unit 138 may obtain the variable length instructions from instruction buffer 110 based on the instruction pointers (block 555). DEC 140 may obtain the variable length instructions from steer unit 138 and decode the instructions (block 565).

As described above, the instruction bytes obtained based on a scan window may be associated with a plurality of variable length instructions. It is noted that although in most cases the length of the instructions will vary, in some cases the length of the associated instructions may be the same size, e.g., the instructions may be single-byte instructions (length of 1). In those cases, the instruction bytes obtained based on a scan window that is 'X' bytes wide may be associated with up to 'X' instructions. For instance, in one specific example, when the scan window is 32 bytes wide, a single 32-byte scan may comprise up to 32 instructions that are one byte wide.

FIG. 6 is a block diagram of one embodiment of processor core 100. Generally speaking, core 100 may be configured to execute instructions that may be stored in a system memory that is directly or indirectly coupled to core 100. Such instructions may be defined according to a particular instruction set architecture (ISA). For example, core 100 may be configured to implement a version of the x86 ISA, although in other embodiments core 100 may implement a different ISA or a combination of ISAs.

In the illustrated embodiment, core 100 may include an instruction cache (IC) 610 coupled to provide instructions to an instruction fetch unit (IFU) 620. IFU 620 may be coupled to a branch prediction unit (BPU) 630 and to an instruction decode unit (DEC) 640. In various embodiments, DEC 640 may be coupled to the components described with reference to FIGS. 1A-4B used for length decoding and identifying boundaries of variable length instructions.

DEC 640 may be coupled to provide operations to a plurality of integer execution clusters 650a-b as well as to a floating point unit (FPU) 660. Each of clusters 650a-b may include a respective cluster scheduler 652a-b coupled to a respective plurality of integer execution units 654a-b. Clusters 650a-b may also include respective data caches 656a-b coupled to provide data to execution units 654a-b. In the illustrated embodiment, data caches 656a-b may also provide data to floating point execution units 664 of FPU 660, which may be coupled to receive operations from FP scheduler 662. Data caches 656a-b and instruction cache 610 may additionally be coupled to core interface unit 670, which may in turn be coupled to a unified L2 cache 680 as well as to a system interface unit (SIU) that is external to core 100 (shown in FIG. 7 and described below). It is noted that although FIG. 6 reflects certain instruction and data flow paths among various units, additional paths or directions for data or instruction flow not specifically shown in FIG. 6 may be provided.

As described in greater detail below, core 100 may be configured for multithreaded execution in which instructions from distinct threads of execution may concurrently execute. In one embodiment, each of clusters 650a-b may be dedicated to the execution of instructions corresponding to a respective one of two threads, while FPU 660 and the upstream instruction fetch and decode logic may be shared among threads. In other embodiments, it is contemplated that different numbers of threads may be supported for concurrent execution, and different numbers of clusters 650 and FPUs 660 may be provided.

Instruction cache 610 may be configured to store instructions prior to their being retrieved, decoded and issued for execution. In various embodiments, instruction cache 610 may be configured as a direct-mapped, set-associative or fully-associative cache of a particular size, such as an 8-way, 64 kilobyte (KB) cache, for example. Instruction cache 610 may be physically addressed, virtually addressed or a combination of the two (e.g., virtual index bits and physical tag bits). In some embodiments, instruction cache 610 may also include translation lookaside buffer (TLB) logic configured to cache virtual-to-physical translations for instruction fetch addresses, although TLB and translation logic may be included elsewhere within core 100.

Instruction fetch accesses to instruction cache 610 may be coordinated by IFU 620. For example, IFU 620 may track the current program counter status for various executing threads and may issue fetches to instruction cache 610 in order to retrieve additional instructions for execution. In the case of an instruction cache miss, either instruction cache 610 or IFU

620 may coordinate the retrieval of instruction data from L2 cache 680. In some embodiments, IFU 620 may also coordinate prefetching of instructions from other levels of the memory hierarchy in advance of their expected use in order to mitigate the effects of memory latency. For example, successful instruction prefetching may increase the likelihood of instructions being present in instruction cache 610 when they are needed, thus avoiding the latency effects of cache misses at possibly multiple levels of the memory hierarchy.

Various types of branches (e.g., conditional or unconditional jumps, call/return instructions, etc.) may alter the flow of execution of a particular thread. Branch prediction unit 630 may generally be configured to predict future fetch addresses for use by IFU 620. In some embodiments, BPU 630 may include a branch target buffer (BTB) that may be configured to store a variety of information about possible branches in the instruction stream. For example, the BTB may be configured to store information about the type of a branch (e.g., static, conditional, direct, indirect, etc.), its predicted target address, a predicted way of instruction cache 610 in which the target may reside, or any other suitable branch information. In some embodiments, BPU 630 may include multiple BTBs arranged in a cache-like hierarchical fashion. Additionally, in some embodiments BPU 630 may include one or more different types of predictors (e.g., local, global, or hybrid predictors) configured to predict the outcome of conditional branches. In one embodiment, the execution pipelines of IFU 620 and BPU 630 may be decoupled such that branch prediction may be allowed to "run ahead" of instruction fetch, allowing multiple future fetch addresses to be predicted and queued until IFU 620 is ready to service them. It is contemplated that during multi-threaded operation, the prediction and fetch pipelines may be configured to concurrently operate on different threads.

As a result of fetching, IFU 620 may be configured to produce sequences of instruction bytes, which may also be referred to as fetch packets. For example, a fetch packet may be 32 bytes in length, or another suitable value. In some embodiments, particularly for ISAs that implement variable-length instructions, there may exist variable numbers of valid instructions aligned on arbitrary boundaries within a given fetch packet, and in some instances instructions may span different fetch packets. Generally speaking DEC 640 may be configured to identify instruction boundaries within fetch packets, e.g., based at least on the information obtained from the components described above with reference to FIGS. 1-4B, to decode or otherwise transform instructions into operations suitable for execution by clusters 650 or FPU 660, and to dispatch such operations for execution. In one embodiment, multiple fetch packets and multiple groups of instruction pointers identifying instruction boundaries may be queued within DEC 640, allowing the decoding process to be decoupled from fetching such that IFU 620 may on occasion "fetch ahead" of decode.

Instructions may then be steered from fetch packet storage into one of several instruction decoders within DEC 640. In one embodiment, DEC 640 may be configured to dispatch up to four instructions per cycle for execution, and may correspondingly provide four independent instruction decoders, although other configurations are possible and contemplated. In embodiments where core 100 supports microcoded instructions, each instruction decoder may be configured to determine whether a given instruction is microcoded or not, and if so may invoke the operation of a microcode engine to convert the instruction into a sequence of operations. Otherwise, the instruction decoder may convert the instruction into one operation (or possibly several operations, in some embodiments) suitable for execution by clusters 650 or FPU 660. The resulting operations may also be referred to as micro-operations, micro-ops, or uops, and may be stored within one or more queues to await dispatch for execution. In some embodiments, microcode operations and non-microcode (or "fastpath") operations may be stored in separate queues.

Dispatch logic within DEC 640 may be configured to examine the state of queued operations awaiting dispatch in conjunction with the state of execution resources and dispatch rules in order to attempt to assemble dispatch parcels. For example, DEC 640 may take into account the availability of operations queued for dispatch, the number of operations queued and awaiting execution within clusters 650 and/or FPU 660, and any resource constraints that may apply to the operations to be dispatched. In one embodiment, DEC 640 may be configured to dispatch a parcel of up to four operations to one of clusters 650 or FPU 660 during a given execution cycle.

In one embodiment, DEC 640 may be configured to decode and dispatch operations for only one thread during a given execution cycle. However, it is noted that IFU 620 and DEC 640 need not operate on the same thread concurrently. Various types of thread-switching policies are contemplated for use during instruction fetch and decode. For example, IFU 620 and DEC 640 may be configured to select a different thread for processing every N cycles (where N may be as few as 1) in a round-robin fashion. Alternatively, thread switching may be influenced by dynamic conditions such as queue occupancy. For example, if the depth of queued decoded operations for a particular thread within DEC 640 or queued dispatched operations for a particular cluster 650 falls below a threshold value, decode processing may switch to that thread until queued operations for a different thread run short. In some embodiments, core 100 may support multiple different thread-switching policies, any one of which may be selected via software or during manufacturing (e.g., as a fabrication mask option).

Generally speaking, clusters 650 may be configured to implement integer arithmetic and logic operations as well as to perform load/store operations. In one embodiment, each of clusters 650a-b may be dedicated to the execution of operations for a respective thread, such that when core 100 is configured to operate in a single-threaded mode, operations may be dispatched to only one of clusters 650. Each cluster 650 may include its own scheduler 652, which may be configured to manage the issuance for execution of operations previously dispatched to the cluster. Each cluster 650 may further include its own copy of the integer physical register file as well as its own completion logic (e.g., a reorder buffer or other structure for managing operation completion and retirement).

Within each cluster 650, execution units 654 may support the concurrent execution of various different types of operations. For example, in one embodiment execution units 654 may support two concurrent load/store address generation (AGU) operations and two concurrent arithmetic/logic (ALU) operations, for a total of four concurrent integer operations per cluster. Execution units 654 may support additional operations such as integer multiply and divide, although in various embodiments, clusters 650 may implement scheduling restrictions on the throughput and concurrency of such additional operations with other ALU/AGU operations. Additionally, each cluster 650 may have its own data cache 656 that, like instruction cache 610, may be implemented using any of a variety of cache organizations. It is noted that data caches 656 may be organized differently from instruction cache 610.

In the illustrated embodiment, unlike clusters 650, FPU 660 may be configured to execute floating-point operations from different threads, and in some instances may do so concurrently. FPU 660 may include FP scheduler 662 that, like cluster schedulers 652, may be configured to receive, queue and issue operations for execution within FP execution units 664. FPU 660 may also include a floating-point physical register file configured to manage floating-point operands. FP execution units 664 may be configured to implement various types of floating point operations, such as add, multiply, divide, and multiply-accumulate, as well as other floating-point, multimedia or other operations that may be defined by the ISA. In various embodiments, FPU 660 may support the concurrent execution of certain different types of floating-point operations, and may also support different degrees of precision (e.g., 64-bit operands, 128-bit operands, etc.). As shown, FPU 660 may not include a data cache but may instead be configured to access the data caches 656 included within clusters 650. In some embodiments, FPU 660 may be configured to execute floating-point load and store instructions, while in other embodiments, clusters 650 may execute these instructions on behalf of FPU 660.

Instruction cache 610 and data caches 656 may be configured to access L2 cache 680 via core interface unit 670. In one embodiment, CIU 670 may provide a general interface between core 100 and other cores 101 within a system, as well as to external system memory, peripherals, etc. L2 cache 680, in one embodiment, may be configured as a unified cache using any suitable cache organization. Typically, L2 cache 680 will be substantially larger in capacity than the first-level instruction and data caches.

In some embodiments, core 100 may support out of order execution of operations, including load and store operations. That is, the order of execution of operations within clusters 650 and FPU 660 may differ from the original program order of the instructions to which the operations correspond. Such relaxed execution ordering may facilitate more efficient scheduling of execution resources, which may improve overall execution performance.

Additionally, core 100 may implement a variety of control and data speculation techniques. As described above, core 100 may implement various branch prediction and speculative prefetch techniques in order to attempt to predict the direction in which the flow of execution control of a thread will proceed. Such control speculation techniques may generally attempt to provide a consistent flow of instructions before it is known with certainty whether the instructions will be usable, or whether a misspeculation has occurred (e.g., due to a branch misprediction). If control misspeculation occurs, core 100 may be configured to discard operations and data along the misspeculated path and to redirect execution control to the correct path. For example, in one embodiment clusters 650 may be configured to execute conditional branch instructions and determine whether the branch outcome agrees with the predicted outcome. If not, clusters 650 may be configured to redirect IFU 620 to begin fetching along the correct path.

Separately, core 100 may implement various data speculation techniques that attempt to provide a data value for use in further execution before it is known whether the value is correct. For example, in a set-associative cache, data may be available from multiple ways of the cache before it is known which of the ways, if any, actually hit in the cache. In one embodiment, core 100 may be configured to perform way prediction as a form of data speculation in instruction cache 610, data caches 656 and/or L2 cache 680, in order to attempt to provide cache results before way hit/miss status is known. If incorrect data speculation occurs, operations that depend on misspeculated data may be "replayed" or reissued to execute again. For example, a load operation for which an incorrect way was predicted may be replayed. When executed again, the load operation may either be speculated again based on the results of the earlier misspeculation (e.g., speculated using the correct way, as determined previously) or may be executed without data speculation (e.g., allowed to proceed until way hit/miss checking is complete before producing a result), depending on the embodiment. In various embodiments, core 100 may implement numerous other types of data speculation, such as address prediction, load/store dependency detection based on addresses or address operand patterns, speculative store-to-load result forwarding, data coherence speculation, or other suitable techniques or combinations thereof.

Figure 7:
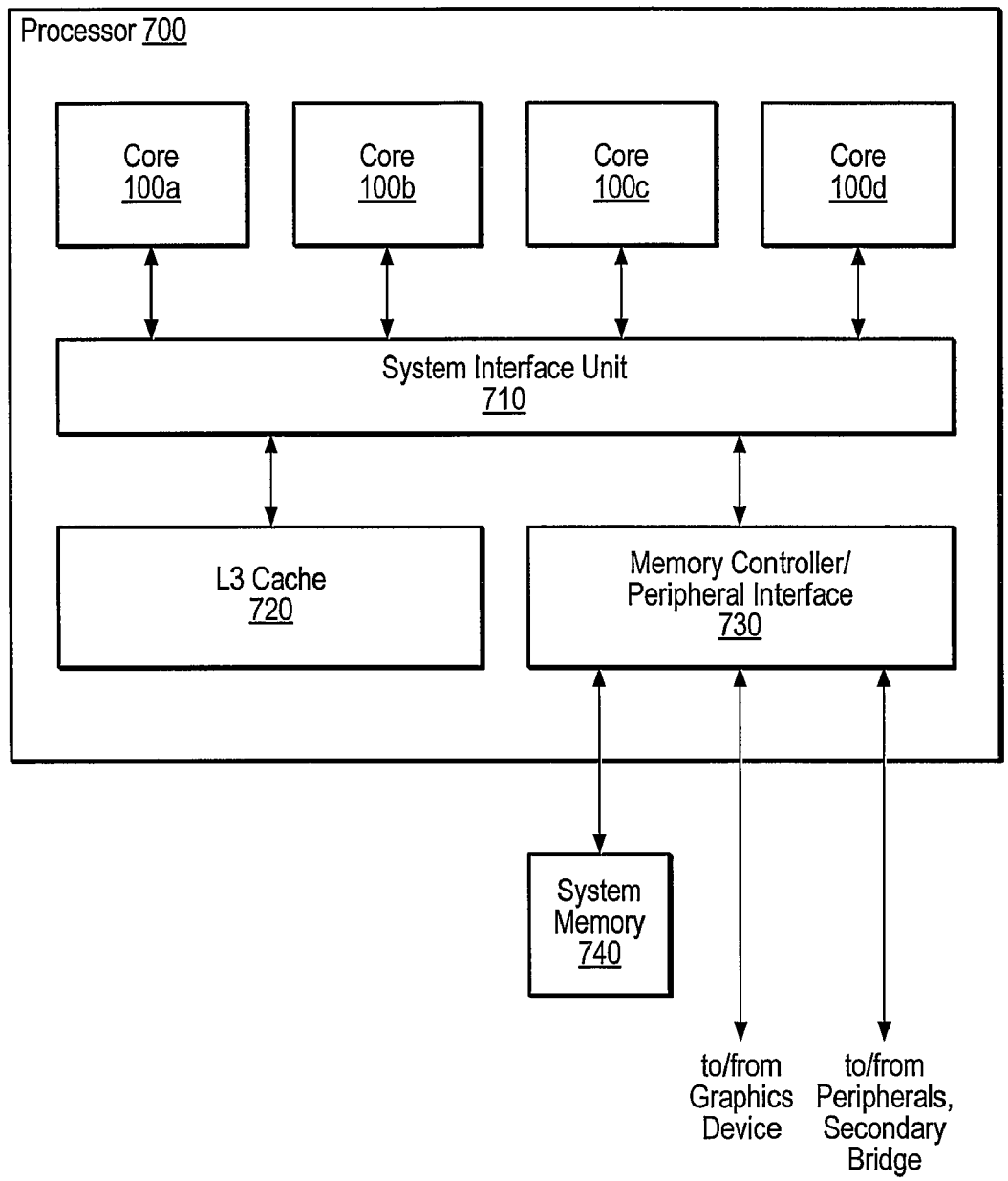
FIG. 7 is a block diagram of one embodiment of a processor including multiple processing cores.

In various embodiments, a processor implementation may include multiple instances of core 100 fabricated as part of a single integrated circuit along with other structures. One such embodiment of a processor is illustrated in FIG. 7. As shown, processor 700 includes four instances of core 100a-d, each of which may be configured as described above. In the illustrated embodiment, each of cores 100 may couple to an L3 cache 720 and a memory controller/peripheral interface unit (MCU) 730 via a system interface unit (SIU) 710. In one embodiment, L3 cache 720 may be configured as a unified cache, implemented using any suitable organization, that operates as an intermediate cache between L2 caches 680 of cores 100 and relatively slow system memory 740.

MCU 730 may be configured to interface processor 700 directly with system memory 740. For example, MCU 730 may be configured to generate the signals necessary to support one or more different types of random access memory (RAM) such as Dual Data Rate Synchronous Dynamic RAM (DDR SDRAM), DDR-2 SDRAM, Fully Buffered Dual Inline Memory Modules (FB-DIMM), or another suitable type of memory that may be used to implement system memory 740. System memory 740 may be configured to store instructions and data that may be operated on by the various cores 100 of processor 700, and the contents of system memory 740 may be cached by various ones of the caches described above.

Additionally, MCU 730 may support other types of interfaces to processor 700. For example, MCU 730 may implement a dedicated graphics processor interface such as a version of the Accelerated/Advanced Graphics Port (AGP) interface, which may be used to interface processor 700 to a graphics-processing subsystem, which may include a separate graphics processor, graphics memory and/or other components. MCU 730 may also be configured to implement one or more types of peripheral interfaces, e.g., a version of the PCI-Express bus standard, through which processor 700 may interface with peripherals such as storage devices, graphics devices, networking devices, etc. In some embodiments, a secondary bus bridge (e.g., a "south bridge") external to processor 700 may be used to couple processor 700 to other peripheral devices via other types of buses or interconnects. It is noted that while memory controller and peripheral interface functions are shown integrated within processor 700 via MCU 730, in other embodiments these functions may be implemented externally to processor 700 via a conventional "north bridge" arrangement. For example, various functions of MCU 730 may be implemented via a separate chipset rather than being integrated within processor 700.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processing unit comprising:
an instruction cache configured to store a plurality of variable length instructions retrieved from the memory unit and which are to be executed by the processing unit;
an instruction buffer configured to store instruction bytes associated with the plurality of variable length instructions that have been retrieved from the instruction cache; and
a length decode unit configured to obtain a plurality of the instruction bytes from the instruction buffer;
wherein the length decode unit is configured to perform a length decode operation for each of the plurality of instruction bytes, wherein, for each instruction byte, the length decode unit is configured to estimate the instruction length of a current variable length instruction associated with a current instruction byte; and
wherein, during the length decode operation, for each instruction byte, the length decode unit is further configured to estimate the start of a next variable length instruction based on the estimated instruction length of the current variable length instruction and a byte position of the current instruction byte within a scan window, and to store within a pointer buffer that is separate from the instruction buffer, a first pointer to the estimated start of the next variable length instruction.

2. The processing unit of claim 1, wherein, for each instruction byte, the length decode unit is configured to estimate the instruction length of the current variable length instruction associated with the current instruction byte based on the assumption that the current instruction byte is the start of the current variable length instruction.

3. The processing unit of claim 1, wherein the length decode unit is configured to obtain a plurality of the instruction bytes based on a scan window of a predetermined size, wherein each instruction byte is associated with a byte position within the scan window.

4. The processing unit of claim 3, wherein, during the length decode operation, for each instruction byte, the length decode unit is configured to estimate a byte position corresponding to the start of the next variable length instruction based on the estimated instruction length of the current variable length instruction and a byte position associated with the current instruction byte.

5. The processing unit of claim 4, wherein, during the length decode operation, for each instruction byte, the length decode unit is configured to estimate a byte position corresponding to the start of the next variable length instruction by adding the estimated instruction length of the current variable length instruction to the byte position associated with the current instruction byte.

6. The processing unit of claim 4, wherein, for each instruction byte, the length decoder is configured to store a first pointer to the byte position corresponding to the estimated start of the next variable length instruction at a buffer location associated with the current instruction byte.

7. The processing unit of claim 1, wherein each of the variable length instructions is comprised of one or more of the plurality of instruction bytes.

8. The processing unit of claim 1, wherein length decode unit includes a plurality of length decoders, wherein the length decode unit is configured to perform a length decode operation for each of the plurality of instruction bytes simultaneously using the plurality of length decoders.

9. The processing unit of claim 3, further comprising a pick unit configured to obtain a start pointer, which points to the instruction byte corresponding to the actual start of a first variable length instruction within the scan window, wherein the pick unit is configured to use a plurality of related first pointers, starting with the first pointer associated with the instruction byte corresponding to the actual start of the first variable length instruction, to determine the actual start of each of the remaining variable length instructions within the scan window, and generate instruction pointers to the actual start of each of the remaining variable length instructions.

10. The processing unit of claim 9, wherein the pick unit is configured to use the first pointer associated with the instruction byte corresponding to the actual start of the first variable length instruction to determine the actual start of the next variable length instruction within the scan window, and generate an instruction pointer to the actual start of the next variable length instructions, wherein the pick unit is configured to use the first pointer associated with the instruction byte corresponding to the actual start of the next variable length instruction to determine the actual start of a subsequent variable length instruction following the next variable length instruction within the scan window, and generate an instruction pointer to the actual start of the subsequent variable length instruction.

11. The processing unit of claim 9, further comprising an instruction decode unit, wherein the instruction decode unit is configured to obtain the instruction pointers indicating the actual start of the variable length instructions within the scan window, wherein the instruction decode unit is configured to obtain the variable length instructions using the instruction pointers and decode the variable length instructions.

12. The processing unit of claim 1, further comprising the instruction buffer coupled to the length decode unit, wherein the instruction buffer is configured to store instruction bytes associated with variable length instructions which are to be executed by the processing unit.

13. The processing unit of claim 3, wherein length decode unit includes a plurality of length decoders, wherein each of the plurality of length decoders is configured to receive at least a current instruction byte, wherein for each length decoder the current instruction byte is a corresponding one of the plurality of instruction bytes obtained from the instruction buffer, wherein each length decoder is configured to perform a length decode operation for the current instruction byte, wherein each length decoder is configured to estimate the instruction length of a current variable length instruction associated with the current instruction byte, wherein, during the length decode operation, each length decoder is further configured to estimate the start of a next variable length instruction based on the estimated instruction length of the current variable length instruction, and store a first pointer to the estimated start of the next variable length instruction.

14. The processing unit of claim 13, wherein each of the plurality of length decoders is configured to receive the current instruction byte and one or more subsequent instruction bytes within the scan window to estimate the instruction length of the current variable length instruction associated with the current instruction byte.

15. A method comprising:
retrieving a plurality of instruction bytes from an instruction cache and storing the plurality of instruction bytes within an instruction buffer, wherein the instruction bytes are associated with a plurality of variable length instructions which are to be executed by a processing unit;

retrieving the plurality of instruction bytes from the instruction buffer;

for each instruction byte, estimating the instruction length of a current variable length instruction associated with a current instruction byte;

for each instruction byte, estimating the start of a next variable length instruction based on the estimated instruction length of the current variable length instruction and a byte position of the current instruction byte within a scan window; and for each instruction byte, storing within a pointer buffer that is separate from the instruction buffer and the instruction cache, a first pointer to the estimated start of the next variable length instruction.

16. The method of claim 15, wherein, for each instruction byte, said estimating the instruction length of the current variable length instruction associated with the current instruction byte is based on the assumption that the current instruction byte is the start of the current variable length instruction.

17. The method of claim 15, wherein said retrieving a plurality of instruction bytes includes retrieving a plurality of instruction bytes based on a scan window of a predetermined size, wherein each instruction byte is associated with a byte position within the scan window, wherein, for each instruction byte, said estimating the start of a next variable length instruction includes estimating a byte position corresponding to the start of the next variable length instruction based on the estimated instruction length of the current variable length instruction and a byte position associated with the current instruction byte.

18. A processor system comprising:
a memory unit; and
a processing unit coupled to the memory unit, wherein the processing unit includes:
an instruction cache configured to store a plurality of variable length instructions retrieved from the memory unit and which are to be executed by the processing unit;
an instruction buffer configured to store instruction bytes associated with the plurality of variable length instructions that have been retrieved from the instruction cache; and
a length decode unit configured to obtain a plurality of the instruction bytes from the instruction buffer, wherein the length decode unit is configured to perform a length decode operation for each of the plurality of instruction bytes, wherein, for each instruction byte, the length decode unit is configured to estimate the instruction length of a current variable length instruction associated with a current instruction byte;
wherein, during the length decode operation, for each instruction byte, the length decode unit is further configured to estimate the start of a next variable length instruction based on the estimated instruction length of the current variable length instruction and a byte position of the current instruction byte within a scan window, and to store within a pointer buffer that is separate from the instruction buffer and the instruction cache, a first pointer to the estimated start of the next variable length instruction.

19. The system of claim 18, wherein, for each instruction byte, the length decode unit is configured to estimate the instruction length of the current variable length instruction associated with the current instruction byte based on the assumption that the current instruction byte is the start of the current variable length instruction.

20. The system of claim 18, wherein the memory unit is configured as a cache memory of the processor system, and the processing unit is configured as a processor core of the processor system.

* * * * *